United States Patent
Sherman et al.

(10) Patent No.: US 11,220,621 B2
(45) Date of Patent: *Jan. 11, 2022

(54) METHOD OF IMPROVING WELLBORE INTEGRITY AND LOSS CONTROL

(71) Applicant: TERVES, LLC, Euclid, OH (US)

(72) Inventors: Andrew Sherman, Mentor, OH (US); Mrigadhara V Raghu V Meesala, Euclid, OH (US)

(73) Assignee: Terves, LLC, Euclid, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/930,740

(22) Filed: Jul. 16, 2020

(65) Prior Publication Data

US 2020/0354622 A1 Nov. 12, 2020

Related U.S. Application Data

(63) Continuation of application No. 16/382,647, filed on Apr. 12, 2019, now Pat. No. 10,851,284.

(60) Provisional application No. 62/658,279, filed on Apr. 16, 2018.

(51) Int. Cl.
| | |
|---|---|
| *C09K 8/518* | (2006.01) |
| *E21B 33/138* | (2006.01) |
| *C09K 8/504* | (2006.01) |
| *C09K 8/50* | (2006.01) |
| *C09K 8/80* | (2006.01) |

(52) U.S. Cl.
CPC ............ *C09K 8/518* (2013.01); *C09K 8/5045* (2013.01); *E21B 33/138* (2013.01); *C09K 8/501* (2013.01); *C09K 8/80* (2013.01); *C09K 2208/08* (2013.01)

(58) Field of Classification Search
CPC ......... C04B 18/02; C04B 28/14; C04B 28/04; C04B 14/185; C04B 20/1055; C04B 20/1066; C04B 7/02; C04B 2201/20; C04B 16/08
See application file for complete search history.

(56) References Cited

U.S. PATENT DOCUMENTS 10,851,284 B2 * 12/2020 Sherman .............. C09K 8/5045

* cited by examiner

*Primary Examiner* — Zakiya W Bates
(74) *Attorney, Agent, or Firm* — Ulmer & Berne LLP; Brian Turung (57) ABSTRACT

A method for enhancing wellbore integrity and/or for sealing a wellbore by sealing formation or micro-annulus fractures in a wellbore. Such sealing can be at least partially accomplished by the use of timed expansion of an expandable sealant material that is placed a wellbore. The expansion of the expandable sealant material causes the cement surface or formation surface to be compressed, thereby creating a tight seal and/or eliminating annulus cracking, fracture, and/or gas channels in the wellbore. A degradable polymer can be used when restoration of the wellbore formation is desired.

33 Claims, 3 Drawing Sheets

METHOD OF IMPROVING WELLBORE INTEGRITY AND LOSS CONTROL

The present invention is a continuation of U.S. application Ser. No. 16/382,647 filed Apr. 12, 2019, which in turn claims priority on U.S. Provisional Application Ser. No. 62/658,279 filed Apr. 16, 2018, which is incorporated herein by reference.

TECHNICAL FIELD

The present invention relates to a method for inhibiting or preventing leakage in cemented, cased boreholes, and/or for controlling fluid losses during drilling and open hole completion operations, and to an expandable material that can be used to inhibit or prevent leakage in cemented, cased boreholes. As such, the present invention pertains to a method for enhancing wellbore integrity and/or for sealing a wellbore by sealing formation and/or micro-annulus fractures in a wellbore. Such sealing can be at least partially accomplished by the use of timed expansion of an expandable sealant material that is placed in a wellbore. The expansion of the expandable sealant material causes the cement surface or formation surface to be compressed, thereby creating a tight seal and/or eliminating annulus cracking, fracture, and/or gas channels in the wellbore. A degradable polymer can optionally be used when restoration of the wellbore formation is desired.

BACKGROUND OF THE INVENTION

In wellbore applications, including oil, gas, geothermal, wastewater water injection, and other applications, failure of the cement/casing bond can be fairly common. Such failure can result in significant losses of pressure containment. Also, costly drilling can occur when encountering fractures and voids in the well hole. When a well hole is cemented, "micro-annulus" fractures can result in leakage paths between different geothermal zones, and can also possibly lead to contamination of aquifers of the environment. Methods for improving the drilling and cementing process, and for improving the cement/casing bond and blocking fractures have been investigated for years, but further improvement is needed.

Fluids such as oil, natural gas and water are obtained from a subterranean geologic formation (a "reservoir") by drilling a well that penetrates the fluid-bearing formation. Once the well has been drilled to a certain depth, the borehole wall must be supported to prevent collapse and sealed to a liner or casing. Conventional well drilling methods involve the installation of a casing string and cementing between the casing string and the borehole to provide support for the borehole structure, and to provide sealing to prevent fluid communication in the annulus around the casing. After cementing a casing string in place, drilling to greater depths can commence and, after the final cementing job, the well can be completed and put into production.

Wellbore integrity is accomplished by the isolation of different horizontal zones in the wellbore and the isolation of the wellbore from the surrounding environment and, in particular, relates to the casing and cement annulus between the casing and the formation. Loss of wellbore integrity can have catastrophic results, such as a major oil spill, or complete collapse of the casing in the wellbore. In other instances, loss of wellbore integrity can result in undesirable environmental release of fluids from the wellbore (e.g., methane leakage and/or oil seepage). Failure of the integrity of the wellbore becomes more acute towards the end of a well's life when corrosion, degradation of the casing, and stress degradation of the materials of construction in the wellbore, etc. can lead to wellbore collapse and uncontrolled release of fluids from the wellbore. Wellbore cement integrity is paramount to safe and successful oil and natural gas drilling. The wellbore cement acts as the primary barrier between the wellbore and the environment. As a result, an unstable or defective wellbore cement can compromise wellbore integrity, which can be a primary factor contributing to the loss of zonal isolation in oil and gas reserves.

The most widely used well completion systems use cemented casing to line the wellbore and to prevent leakage between the well zones and the environment. For cemented liner completion of a wellbore, a steel casing is run into the wellbore, and then drilling mud is removed from the wellbore by pumping/circulating a fluid. Such fluid circulation is generally through the steel casing and back out through the annulus between the steel casing and the well formation. Centralizers are commonly used to centralize the steel casing in the wellbore, as well as casing rotation, to enable complete removal of the mud and the proper distribution of the cement between the steel casing and the well formation. After the mud clean-up and removal operation is completed, cement is pumped into the space between the steel casing and the well formation. The cement is then allowed to set to form the permanent seal between the steel casing and the well formation. However, the cement seal is often prone to leaking due to gas channeling into the cement, incomplete mud removal prior to the addition of the cement, poor centralization of the steel casing in the well formation, cement shrinkage during the setting of the cement, improper cement mixing or formulation, etc. For example, micro-annulus fractures are micro-separations between the steel casing and the cement that can be caused by a change in temperature or pressure during the cementing setting process and/or after the cement has set. Micro-annulus fractures in cement are a constant problem in oilfield well cementing. It is one of numerous well integrity problems that often result in production reduction and expensive remedial costs. There are various reasons for micro-annulus fracture formation, but the most common reason is the cement shrinkage during cement curing, or changes in stress state during well operation.

In addition to cementing flaws, the failure of the cement casing can be caused by casing stress and/or thermal cycling. In stimulated wells, the steel casing is repeatedly exposed to very high pressures, often near the burst pressure of the steel casing, which can be interspersed with temperature fluctuations due to the pumping of cool fluids. This cyclic stress exposure to the cement casing can cause failure of the cement-casing, or cement-formation interfaces.

Wellbore integrity is the most significant ongoing environmental risk associated with oil and gas activities. In a Macellus study, it was found that 6-9% of wells failed from 2010 (97 wells failed, 6%) to 2012 (120 wells failed, 8.9%). Unconventional tight gas wells, with their significant exposure to high cyclic pressure, failed at six times the rate of conventional wells. The need to develop improved cement integrity remains a major problem in the drilling industry.

Figure 1:
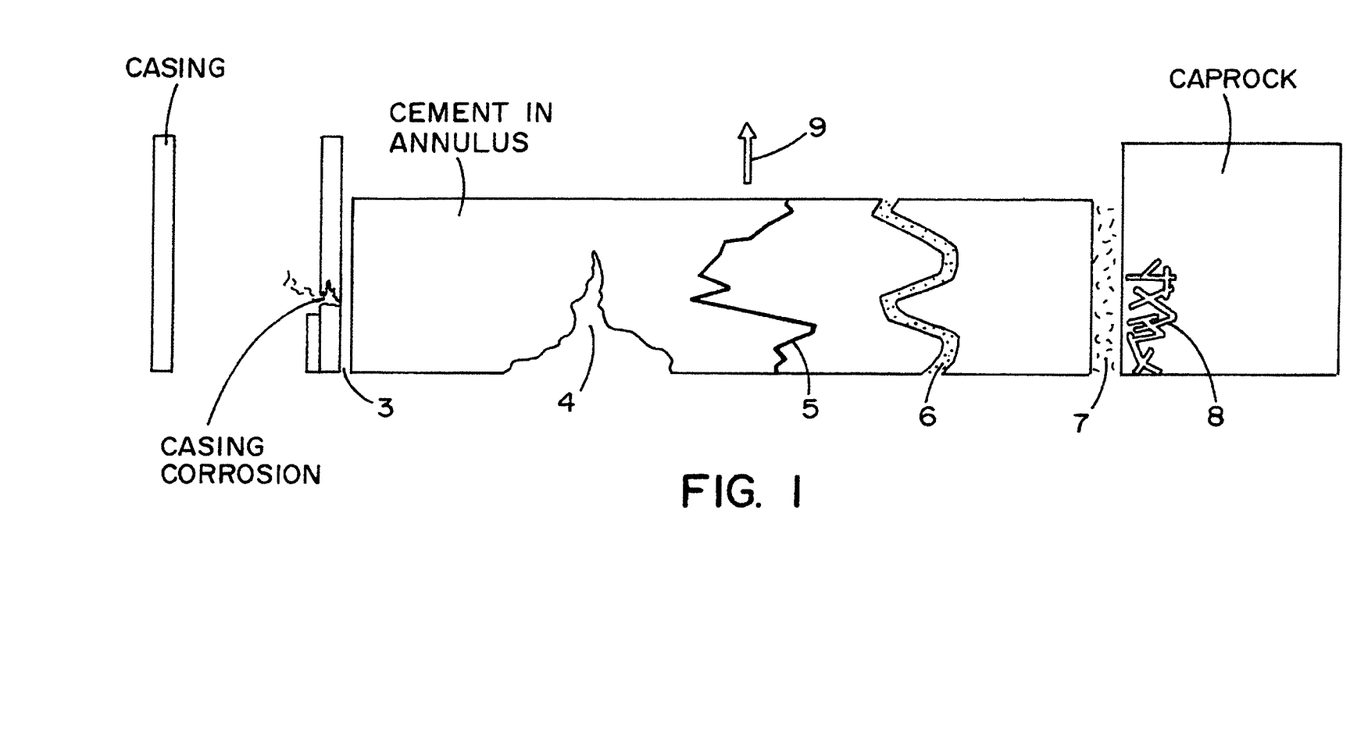
FIG. 1 illustrates various examples of common cement/wellbore failure mechanisms.

FIG. 1 illustrates different integrity failure mechanisms of the cement/casing bond, including formation damage, interface failure, gas channeling, and fracture that can occur to cement casings. As can be appreciated, other types of integrity failure mechanisms of the cement/casing bond can occur. As illustrated in FIG. 1, casing corrosion and/or other types of casing damage can result in fluids flowing in the case and escaping through the wall of the casing. If the cement about the casing is damaged or spaced from the casing, fluids escaping from the casing can leak between the well zones and into the environment. As illustrated by #3 in FIG. 1, a space has formed between the casing and the cement. This can be the result of cement shrinkage, expansion/contractions of the casing, and/or damage to the wellbore wall. As illustrated by #4, #5, and #6, various types of cracks/damage to the cement are illustrated. As illustrated by #7, a space has formed between the cement and the wall of the wellbore. This can be the result of cement shrinkage, expansion/contractions of the casing, and/or damage to the wellbore wall.

Prior art attempts have been made to remediate microannulus fracture degradation through the use of swellable materials. Such materials may be added as an inorganic or swellable elastomer addition to the cement, applied as a coating to the casing outer diameter (OD), or applied as an insert. Common swellables include hydrolizable materials, primarily MgO and CaO that are added directly to the cement to form an expandable cement, or added to a swellable elastomer as a plaque or coating onto the steel casing. Oxidizable materials such as aluminum have been used wherein the aluminum oxidizes and slightly expands by reaction with the cement during curing. Examples of such prior art teachings are disclosed in U.S. Pat. No. 5,040,283 to Pelgrom (Shape memory alloy pipe); U.S. Pat. No. 5,186,215 to Gilleland (Apparatus for repairing pipeline); U.S. Pat. No. 5,901,789 to Donnelly et al. (Deformable well screen); U.S. Pat. No. 6,752,208 to Nguyen (Method of reducing proppant flowback); U.S. Pat. No. 6,775,894 to Hardin (Casing patching tool); U.S. Pat. No. 7,104,317 to Richard et al. (Expandable Composite Tubulars); U.S. Pat. No. 7,159,673 to Van Dijk (Drilling System with Expandable Screen); U.S. Pat. No. 7,478,686 to Richard et al. (One trip well drilling); U.S. Pat. No. 7,819,185 to Shuster et al. (Expandable Tubular); U.S. Pat. No. 8,800,650 to Spray et al. (Expandable casing); U.S. Pat. No. 8,993,491 to James et al. (Swellable compositions for borehole); US 2013/0056207 to Wood et al. (Downhole sealing system); and US 2016/0040038 to Cornelisson et al. (Coating composition and method), all of which are incorporated herein by reference.

However, methods to control the degree of expansion and the force applied have not been present in prior disclosures, nor methods of placing the expandables and controlling the application of force in situ.

In view of the current state of wellbore systems, there is a continued need to prevent leakage between the well zones and the environment.

SUMMARY OF THE INVENTION

In accordance with the present invention, there is provided an expandable sealing addition that addresses problems associated with cement cracking and failure, as well as to address poor cementing due to leak-off into formation fractures initiated during the cementing process. The present invention relates to an expandable sealant material that allows for control over the timing of expansion of the expandable sealant material, the amount of applied stress by the expandable sealant material, and/or amount of expansion of the expandable sealant material, as well as a method of controlling the placement of the expandable sealant material in a wellbore during wellbore operations.

In accordance with one non-limiting aspect of the present invention, there is provided a method of wellbore sealing using an expandable sealant material that can be 1) added to cement during the cementing process, 2) pre-placed at casing/cement bond or cement-formation annulus locations to offset gas channeling, annulus debonding, and other common cement integrity problems, and/or 3) added to drilling and completion fluids to stop leak-off by sealing fractures and reinforcing the wellbore by controlling formation stresses. The expandable sealant material in accordance with the present invention is generally a permanently expandable elastomeric; however, this is not required. The expandable sealant material can be used to 1) seal cracks, fractures, etc. in the cement and/or casing, and/or 2) place the cement and/or formation into compression to enhance strength and to thereby prevent fracturing and/or channeling in the cement and/or to prevent further fracturing and/or channeling in the cement. The method of application of the expandable sealant material, time of the swelling of the expandable sealant material, and/or the force applied by the expandable sealant material can be engineered to improve wellbore integrity. Application of force by the expandable sealant material can be engineered to occur before, during, and/or after the setting of the cement. Also, the application of force by the expandable sealant material can be engineered to continue to expand over a period of time (e.g., one-to-two weeks, one-to-two months, one-to-two years, etc.), and/or be engineered to expand at different time periods during the life of the wellbore and well operation (e.g., first cause expansion of expandable sealant material at the time the cement sets, again cause expansion of expandable sealant material one-to-three months after cement has sent, again cause expansion of expandable sealant material one-to-three years after cement has set, etc.). Also, the expandable sealant material can be engineered to expand upon exposure to a trigger (e.g., pH change, chemical environment change, electric current exposure, temperature change, sound waves, electromagnetic radiation, etc.) so that when it is desirable to cause the expandable sealant material to expand (e.g., detection of cracks or fractures in the cement, detection of weaken formation, etc.), the expandable sealant material can be caused to expand to seal cracks, fractures, etc. and/or to enhance the strength of the formation and/or cement, etc. The elastomer stiffness of the expandable sealant material can be engineered to be controlled. The expandable sealant material can be engineered to be permanent, degradable, or dissolvable.

When the expandable sealant material is engineered to expand over a period of time, and/or be engineered to expand at different time periods during the life of the wellbore and well operation, the expandable sealant material can include 1) expandable sealant materials that have different degradable or dissolvable coatings and/or different degradable or dissolvable coating thicknesses to result in the different timing of expansion of the expandable sealant material, 2) expandable sealant materials that are formed of different elastic-plastic binders, and/or 3) expandable sealant materials that are formed of different expandable fillers. By varying one or more of these parameters, engineered expandable sealant material can be formed such that the expandable sealant material 1) expands at different time periods, and/or 2) expands at a different rate.

In another and/or alternative aspect of the present invention, the expandable sealant material can be engineered to have 1) controlled stiffness, 2) time-delayed expansion, and/or 3) controlled expansion. The expandable sealant material can be either dispersed in the cement or applied at interface areas where the expandable sealant material can apply residual compressive stresses into the cement and/or wellbore formation interface. These compressive stresses can be used to enhance sealing at the casing/cement bond and/or cement-formation interfaces, and/or to force closure of gas channels or bubbles that may have formed during the cement pumping stage. In loss control applications, the expandable sealant material can be used to stabilize the wellbore while sealing fractures and flow paths and preventing further fluid loss. The expandable sealant material can also provide an elastomeric sealing capability to the casing/cement bond and/or cement-formation interface and constrain the cement and casing in continuous compression. The casing/cement bond optimum interface is engineered based on the impacts of corrosion (e.g., rust formation), thermal stresses (fracture propagation), and cement chemistry. By understanding the impact of these parameters on casing/cement bond integrity, a solution can be engineered by controlling the timing, rate, and extent of the expansion of the expandable sealant material, and the load transfer of the expandable sealant material to the cement through stiffness/modulus and dimensional control. As such, a resilient sealing interface can be generated by the expandable sealant material that is compliant with casing thermal and pressure cycles and which enhances cement integrity. The expandable sealant material can thus be used for crack deflection or propagation prevention, and/or fracture sealing in the cement. The expandable sealant material can also be used to improve cement integrity.

One non-limiting aspect of the present invention is to employ non-traditional materials for well tubulars, drilling mud loss control, and pipe repair by taking advantage of an expandable sealant material.

Another and/or alternative non-limiting aspect of the present invention is the provision of an expandable sealant material that includes one or more expandable fillers that have been added into one or more polymers to form the expandable sealant material.

Another and/or alternative non-limiting aspect of the present invention is the provision of a method of wellbore sealing using an expandable sealant material that can be 1) added to cement during the cementing process, 2) pre-placed at casing/cement bond and/or cement-formation annulus locations to offset gas channeling, annulus debonding, and other common cement integrity problems, and/or 3) added to drilling and completion fluids to stop leak-off by sealing fractures and/or reinforcing the wellbore.

Another and/or alternative non-limiting aspect of the present invention is the provision of an expandable sealant material that is partially or fully formed of a permanently expandable elastomeric polymer that can be used to 1) seal cracks, fractures, etc., and/or 2) place the cement and/or formation into compression to enhance strength and to thereby prevent fracturing and/or channeling in the cement and/or to prevent further fracturing and/or channeling in the cement.

Another and/or alternative non-limiting aspect of the present invention is the provision of an expandable sealant material engineered to control the time of the swelling of the expandable sealant material, and/or the force applied by the expandable sealant material.

Another and/or alternative non-limiting aspect of the present invention is the provision of an expandable sealant material engineered to control the time of the swelling of the expandable sealant material to occur before, during, and/or after the setting of the cement.

Another and/or alternative non-limiting aspect of the present invention is the provision of an expandable sealant material that includes a degradable or dissolvable coating that is used to control the time of the swelling of the expandable sealant material. The coating can be a polymer material and/or a metallic material. The coating thickness of the degradable or dissolvable coating is non-limiting. In one non-limiting embodiment, the coating thickness of the degradable or dissolvable coating is about 0.0001-0.5 mm.

Another and/or alternative non-limiting aspect of the present invention is the provision of an expandable sealant material engineered to continue to expand over a period of time (e.g., one-to-two weeks, one-to-two months, one-to-two years, etc.), and/or be engineered to expand at different time periods during the life of the wellbore and well operation (e.g., first cause expansion of expandable sealant material at the time the cement sets, again cause expansion of expandable sealant material one-to-three months after cement has sent, again cause expansion of expandable sealant material one-to-three years after cement has set, etc.). When the expandable sealant material is engineered to expand over a period of time, the expandable sealant material can optionally be coated with a dissolvable or degradable material that can be used to delay the expansion of the expandable sealant material.

Another and/or alternative non-limiting aspect of the present invention is the provision of an expandable sealant material engineered to expand upon exposure to a trigger (e.g., pH change, chemical environment change, electric current exposure, temperature change, sound waves, electromagnetic radiation, etc.) so that, when it is desirable to cause the expandable sealant material to expand (e.g., detection of cracks or fractures in the cement, detection of weakened formation, etc.), the expandable sealant material can be controllably caused to expand to seal cracks, fractures, etc. and/or to enhance the strength of the formation and/or cement, etc.

Another and/or alternative non-limiting aspect of the present invention is the provision of an expandable sealant material engineered to be permanent, degradable, or dissolvable.

Another and/or alternative non-limiting aspect of the present invention is the provision of an expandable sealant material that can be a) dispersed in the cement, b) dispersed about the casing, and/or c) dispersed about the formation wall such that the expandable sealant material can apply residual compressive stresses in the cement and/or on the wellbore formation interface.

Another and/or alternative non-limiting aspect of the present invention is the provision of an expandable sealant material that can be placed at certain interface areas where the expandable sealant material can apply residual compressive stresses into certain regions (e.g., only at certain well zones, only at a region that includes defective cement, only at a region where there is channeling between the cement and the wellbore formation, only at a region where there is channeling between the cement and the casing, and/or only at a region where damage in the wellbore formation, etc., has been detected.

Another and/or alternative non-limiting aspect of the present invention is the provision of an expandable sealant material that creates compressive stresses that can be used to enhance sealing at the casing/cement bond and cement-formation interfaces, and/or force closure of gas channels or bubbles that may have formed during the cement pumping stage to close.

Another and/or alternative non-limiting aspect of the present invention is the provision of an expandable sealant material that stabilizes the wellbore while sealing fractures and flow paths and preventing further fluid loss.

Another and/or alternative non-limiting aspect of the present invention is the provision of an expandable sealant material that provides an elastomeric sealing capability to the casing/cement bond and/or cement-formation interface and constrains the cement and casing in continuous compression.

Another and/or alternative non-limiting aspect of the present invention is the provision of an expandable sealant material that can be used for crack deflection, propagation prevention, and/or fracture sealing in the cement.

Another and/or alternative non-limiting aspect of the present invention is the provision of an expandable sealant material that improves cement integrity.

Another and/or alternative non-limiting aspect of the present invention is the provision of a method for improving integrity of a wellbore consisting of 1) preparing particulate or formed expandable sealant material containing a reactive inorganic material or filler and elastic-plastic or polymer binder, 2) providing an oxidizing fluid, such as an aqueous or $CO_2$-containing wellbore fluid, 3) placing the expandable sealant material in the wellbore or formation as a deposit or as a mixture with another material such as cement, 4) exposing the expandable sealant material to the oxidizing wellbore fluid, and 5) allowing the expandable sealant material to expand in a time-controlled manner to create residual compressive stresses to seal the wellbore or fracture.

Another and/or alternative non-limiting aspect of the present invention is the provision of an expandable sealant material in the form of a powder or particulate with a particle size of 0.001-20 mm (and all values and ranges therebetween).

Another and/or alternative non-limiting aspect of the present invention is the provision of an expandable sealant material in the shape of, for example, a football, "knot", pyramid, sheet, fiber, or other engineered shape.

Another and/or alternative non-limiting aspect of the present invention is the provision of an expandable sealant material that includes low density fillers to control buoyancy, such as through the addition of carbon, glass, and/or microballoons (e.g., ceramic microballoons, etc.), or other types of low density fillers (e.g., fillers having a density of less than 1 g/cc).

Another and/or alternative non-limiting aspect of the present invention is the provision of an expandable sealant material having a density within 30% of the wellbore fluid density, and typically within 10% of the wellbore fluid density. In one non-limiting embodiment, the density of the expandable sealant material is ±0-30% of the density of the wellbore fluid. In another non-limiting embodiment, the density of the expandable sealant material is ±0-10% of the density of the wellbore fluid. In another non-limiting embodiment, the density of the expandable sealant material is ±0-5% of the density of the wellbore fluid. In another non-limiting embodiment, the density of the expandable sealant material is at least 1 g/cc, and typically about 1-2 g/cc (and all values and ranges therebetween). In another non-limiting embodiment, the density of the expandable sealant material is about 1.05-1.3 g/cc.

Another and/or alternative non-limiting aspect of the present invention is the provision of an engineered resilient material that is degradable over time, such that it can be removed using temperature, pH, a particular fluid composition, a particular fluid additive, time control, sound waves, and/or electromagnetic radiation.

Another and/or alternative non-limiting aspect of the present invention is the provision of an expandable sealant material that is used for flow diversion or other temporary isolation or blocking function.

Another and/or alternative non-limiting aspect of the present invention is the provision of an expandable sealant material that is placed to provide compression to a formation surface to stabilize or seal the surface.

Another and/or alternative non-limiting aspect of the present invention is the provision of an expandable sealant material that enhances the durability of cement.

Another and/or alternative non-limiting aspect of the present invention is the provision of an expandable sealant material that includes a water-expandable filler or $CO_2$-expandable filler in an engineered thermoplastic or thermosetting polymer matrix.

Another and/or alternative non-limiting aspect of the present invention is the provision of an expandable sealant material that includes an expandable filler, and wherein the expandable filler can be a) MgO, CaO, $Li_2O$, borate, selenium, iron, magnesium, manganese, germanium, calcium, aluminum, sodium, lithium, zinc or other oxidizable metal with a high Biddeford ratio, and/or b) water-swellable clay or $CO_2$-swellable clay, phosphate, carbide, silicate, borate, and/or sulfate.

Another and/or alternative non-limiting aspect of the present invention is the provision of an expandable sealant material where the polymer matrix can be a thermoplastic or thermosetting polymer having a plastic strain to failure of more than 10%.

Another and/or alternative non-limiting aspect of the present invention is the provision of an expandable sealant material where the polymer matrix can be a thermoplastic or thermosetting polymer such as nylon/polyarylates, polycarbonates, polysulfones, polyureas, polyesters, epoxys, polypropylene, polyethylene, TPU, rubber, PVA, PVC, thermoplastic polyolefinelastomers, TPO (TPE-o), thermoplastic vulcanizates, TPV (TPE-v or TPV), thermoplastic polyurethanes, TPU (TPU, thermoplastic copolyester, TPC (TPE-E), thermoplastic polyamides, TPA (TPE-A), TPZ and other engineering plastics and elastomer materials.

Another and/or alternative non-limiting aspect of the present invention is the provision of an expandable sealant material that includes one or more reinforcing fibers, flakes, ribbons, ribs, mesh, filler, or other internal structure.

Another and/or alternative non-limiting aspect of the present invention is the provision of an expandable sealant material that controls lost circulation or fluid inflow during drilling operations.

Another and/or alternative non-limiting aspect of the present invention is the provision of an expandable sealant material that repairs or seals a leak.

Another and/or alternative non-limiting aspect of the present invention is the provision of an expandable sealant material that stabilizes a wellbore.

Another and/or alternative non-limiting aspect of the present invention is the provision of an expandable sealant material where the expandable sealant material has a coating or encapsulant used to control the time at which the expansion and swelling occurs, such as to delay swelling for a specific period of time to allow cement to set.

Another and/or alternative non-limiting aspect of the present invention is the provision of an expandable sealant material wherein the permeability of the polymer matrix and/or the surface area of the expandable filler is used to control the time at which the expansion and swelling occurs, such as to delay swelling for a specific period of time to allow cement to set.

Another and/or alternative non-limiting aspect of the present invention is the provision of a wellbore that includes a casing and an expandable sealant material wherein said expandable sealant material is a) coated on at least a portion of an outer surface of said casing and/or b) intermixed with concrete that is positioned between said casing and in outer surface of said wellbore.

Another and/or alternative non-limiting aspect of the present invention is the provision of a wellbore wherein the coating thickness of said expandable sealant material outer surface of said casing is 0.05-2 inches.

Another and/or alternative non-limiting aspect of the present invention is the provision of a method for improving integrity of a wellbore comprising a) providing an expandable sealant material; b) providing an oxidizing wellbore fluid, such as an aqueous or $CO_2$-containing wellbore fluid; c) placing said expandable sealant material in said wellbore or formation as a deposit or as a mixture with another material such as cement, mud and/or wellbore fluid; d) exposing said expandable sealant material to the oxidizing wellbore fluid; and, e) allowing said expandable sealant material to expand to create compressive stresses to said cement layer, mud layer, wellbore wall, liner wall and/or casing wall to facilitate in sealing said wellbore and/or fracture in said wellbore.

Another and/or alternative non-limiting aspect of the present invention is the provision of a method including the step of preparing said expandable sealant material.

Another and/or alternative non-limiting aspect of the present invention is the provision of a method wherein said expandable sealant material is in the form of a powder or particulate with a particle size of 0.001-20 mm.

Another and/or alternative non-limiting aspect of the present invention is the provision of a method wherein said expandable sealant material is in the shape of, for example, a football, "knot", pyramid, sheet, fiber, or other engineered shape.

Another and/or alternative non-limiting aspect of the present invention is the provision of a method wherein said expandable sealant material includes low density fillers to control buoyancy of said expandable sealant material, said low density fillers including carbon, glass, and/or microballoons.

Another and/or alternative non-limiting aspect of the present invention is the provision of a method wherein said expandable sealant material has a density within 30% of the wellbore fluid density.

Another and/or alternative non-limiting aspect of the present invention is the provision of a method wherein said expandable sealant material has a density within 10% of the wellbore fluid density.

Another and/or alternative non-limiting aspect of the present invention is the provision of a method wherein said expandable sealant material has a density of about 1.05-1.3 g/cc.

Another and/or alternative non-limiting aspect of the present invention is the provision of a method wherein said expandable sealant material is degradable over time, such that it can be partially or fully removed using temperature, pH, fluid, time, fluid composition, sound waves, and/or electromagnetic radiation.

Another and/or alternative non-limiting aspect of the present invention is the provision of a method wherein said expandable sealant material is used for flow diversion or other temporary isolation or blocking function.

Another and/or alternative non-limiting aspect of the present invention is the provision of a method wherein said expandable sealant material is placed in a wellbore to provide compression to a formation surface, and/or to stabilize or seal the surface, such as to control fluid losses.

Another and/or alternative non-limiting aspect of the present invention is the provision of a method wherein said expandable sealant material is used to enhance the durability of cement in a wellbore or other applications.

Another and/or alternative non-limiting aspect of the present invention is the provision of a method wherein said expandable sealant material is used for controlling lost circulation or fluid inflow during drilling operations.

Another and/or alternative non-limiting aspect of the present invention is the provision of a method wherein said expandable sealant material is used for repairing or sealing a leak.

Another and/or alternative non-limiting aspect of the present invention is the provision of a method wherein said expandable sealant material is used for stabilizing a wellbore.

Another and/or alternative non-limiting aspect of the present invention is the provision of a method wherein said expandable sealant material includes a coating or encapsulant, or the permeability of the binder and reactive material surface area on the expandable sealant material's surface to control the time at which the expansion and swelling occurs, such as to delay swelling for a specific period of time to allow cement to set.

Another and/or alternative non-limiting aspect of the present invention is the provision of a method wherein said expandable sealant material expands in volume by 50-500%.

Another and/or alternative non-limiting aspect of the present invention is the provision of a method wherein said expandable sealant material includes a dissolvable and/or degradable coating to delay a time of expansion of said expandable filler.

Another and/or alternative non-limiting aspect of the present invention is the provision of a wellbore that includes an expandable sealant material to at least partially seal fractures in the wellbore and/or to improve the integrity of the wellbore.

Another and/or alternative non-limiting aspect of the present invention is the provision of a method of inserting the expandable sealant material into a wellbore and causing the expandable sealant material to increase in volume to at least partially seal fractures in the wellbore and/or to improve the integrity of the wellbore.

Other objects, advantages, and novel features of the present invention will become apparent from the following detailed description of the invention when considered in conjunction with the accompanying drawings.

BRIEF DESCRIPTION OF THE DRAWINGS

Reference may now be made to the drawings, which illustrate various non-limiting aspects of embodiments that the disclosure may take in physical form and in certain parts and arrangements of parts wherein.

DESCRIPTION OF THE INVENTION

A more complete understanding of the articles/devices, processes and components disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any unavoidable impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The terms "about" and "approximately" can be used to include any numerical value that can vary without changing the basic function of that value. When used with a range, "about" and "approximately" also disclose the range defined by the absolute values of the two endpoints, e.g. "about 2 to about 4" also discloses the range "from 2 to 4." Generally, the terms "about" and "approximately" may refer to plus or minus 10% of the indicated number.

Percentages of elements should be assumed to be percent by weight of the stated element, unless expressly stated otherwise.

Referring now to the drawings, wherein the showings are for the purpose of illustrating non-limiting embodiments of the disclosure only and not for the purpose of limiting the same, the present invention relates to a method for inhibiting or preventing leakage in cemented, cased boreholes, and/or for controlling fluid losses during drilling and open hole completion operations, and also to an expandable sealant material that can be used to accomplish such methods. The present invention also pertains to a method for enhancing wellbore integrity and/or for sealing a wellbore by sealing formation or micro-annulus fractures in a wellbore. Such sealing can be at least partially accomplished by the use of timed expansion of an expandable sealant material that is placed a wellbore. The expansion of the expandable sealant material causes the cement surface or formation surface to be compressed, thereby creating a tight seal and/or eliminating annulus cracking, fracture, and/or gas channels in the wellbore. A degradable polymer can optionally be used when restoration of the wellbore formation is desired.

The expandable sealant material includes a polymer and one or more expandable fillers mixed with the polymer. One non-limiting expandable filler that can be used in the expandable sealant material is iron particles. Iron particles are capable of expanding over 270 vol. % when exposed to high temperature brine or water. The addition of finely divided iron and/or other expandable fillers into a thermoplastic or thermosetting polymer creates an expandable sealant material (with expansions (e.g., linear expansions, etc.) that optionally can be controllable) to cause the expandable sealant material to expand 3-100 vol. % or more. In one non-limiting embodiment of the invention, the addition of expandable fillers into a thermoplastic or thermosetting polymer creates an expandable sealant material that causes the expandable sealant material to expand 5-75 vol. %. In another non-limiting embodiment of the invention, the addition of expandable fillers into a thermoplastic or thermosetting polymer creates an expandable sealant material that causes the expandable sealant material to expand 5-50 vol. %.

Different expandable fillers can be used for the expandable sealant material such as iron, magnesium, aluminum, calcium, sodium, silicon, zinc, titanium, CaO, MgO, $Ca_2C$, $TiH_2$, and/or other materials that react with water, $CO_2$, or other wellbore fluids. Generally, the expandable filler is selected such that it expands in volume by more than 25 vol. % in water, brine, or wellbore fluids (e.g., fracking fluids) at a temperature above 120° F. in a time period of less than five days. Typically, the expandable filler is selected such that it expands in volume by more than 50 vol. % in water, brine, or wellbore fluids (e.g., fracking fluids) at a temperature above 120° F. in a time period of less than five days. In one non-limiting embodiment, the expandable filler is selected such that it expands in volume by 25-500 vol. % (and all values and ranges therebetween) in water, brine, or wellbore fluids (e.g., fracking fluids) at a temperature above 120° F. in a time period of less than five days. In one non-limiting embodiment, the expandable filler is selected such that it expands in volume by 50-500 vol. % (and all values and ranges therebetween) in water, brine, or wellbore fluids (e.g., fracking fluids) at a temperature above 120° F. in a time period of less than five days.

The expandable fillers can be added in a high weight percent content (at least 5 wt. % of the total weight percent of the expandable sealant material) to a polymeric binder or polymer matrix to create the expandable sealant material. In one non-limiting embodiment, the expandable fillers constitute about 5-70 wt. % of the expandable sealant material (and all values and ranges therebetween). In another non-limiting embodiment, the expandable fillers constitute about 10-70 wt. % of the expandable sealant material. In another non-limiting embodiment, the expandable fillers constitute about 15-70 wt. % of the expandable sealant material. In another non-limiting embodiment, the expandable fillers constitute about 15-49.9 wt. % of the expandable sealant material. In another non-limiting embodiment, the expandable fillers constitute about 20-40 wt. % of the expandable sealant material.

By controlling the water permeability of the polymer matrix, and the dimensions of the expandable sealant material (i.e., expandable sheet, expandable particles, expandable sleeve, expandable coating, expandable coating, etc.), the timing of expansion of the expandable sealant material can be controlled. Additional delay coatings or trigger coatings (such as pH-sensitive coatings, temperature-soluble coating, chemically-modifiable coatings, chemically-degradable or -dissolvable coatings, etc.) such as, but not limited to, polymer coatings, can be used to control the timing of expansion of the expandable sealant material. Control over the elastic modulus of the polymeric matrix or binder as well as total amount of expansion of the expandable sealant material can also or alternatively be used to control the amount of stress and strain applied to the fracture, void, or cement.

The expandable sealant material can be placed in the well by addition to a wellbore fluid, or by dropping a weighted "pill" or slug that is formed of or contains the expandable sealant material and then dispersing the expandable sealant in the wellbore once the expandable sealant material is at a desired depth in the wellbore. The expandable sealant material can be placed on the formation and casing surfaces by adding the expandable sealant material to a mud-cleaning fluid, such as by adding a slug at the end of the clean-up process prior to pumping cement into the wellbore. Addition of adhesive monomers, tacifying coatings, or other additions to the expandable sealant material can be used to cure the polymer in the expandable sealant material and/or be used to attach the expandable sealant material in situ in the wellbore in order to secure the expandable sealant material in a particular region or location in the wellbore. The expandable sealant material can be added to the cement, either prior to or during the pumping process. The shape of the expandable sealant material is non-limiting. For example, the shape of the expandable sealant material can be in the form of a sheet, flake, compressed foam, spheres, filaments, rods, or other shaped objects. Also, the expandable sealant material can be in the form of a powder from 20-2000 microns (and all values and ranges therebetween) or larger so that the expandable sealant material can be used as additions to other materials (e.g., cement, mud, etc.); and/or the expandable sealant material can be added to pumpable materials (fracking fluids, brine, etc.). For loss control applications and the sealing of fractures, the expandable sealant material can be in the form of elliptical shapes, football shapes, "knot", rope, sheet, dart shapes or other shapes so that the expandable sealant material can be lodged into the fractures in the wellbore and expand to seal the fracture and reinforce the wellbore by placing the formation into compression by the expansion of the expandable sealant material.

In general, the amount and stiffness of the expandable sealant material should be sufficient to prevent transfer of stresses or strains which propagate or extend fractures in the cement. Such properties of the expandable sealant material can be achieved by the use of an expandable sealant material that expands in volume by at least 5 vol. %, and typically about 5-50 vol. % or more (and all values and ranges therebetween), and wherein the polymer of the expandable sealant material has an elastic modulus of about 100-1000 MPa (and values and ranges therebetween), thereby resulting in an expandable sealant material having an expandable modulus of about 250-2500 MPa (and all values and ranges therebetween).

In order to improve wellbore integrity, the expandable sealant material can be used as coating slurries for the casing and formation surfaces, and/or as particulate additions for the cement to impart controlled compressive forces and reduce or eliminate gas channels in cement. By controlling the stiffness of the binder (polymer material) and the particle size (expandable filler) of the expandable sealant material, a controlled compressive force can be applied with typical expansiveness of 10-100 vol. % (and all values and ranges therebetween), and generally 20-40 vol. %. In a constrained environment, both the geometric particle design (foam, hollow sphere, solid) of the expandable sealant material, as well as elastomer stiffness and compressibility of the expandable sealant material, can be used to reduce or eliminate gas channels in cement and/or improve the integrity of the wellbore.

Prior art rigid expandable fillers are optimized for high stiffness for peak stress application of 4-8,000 psig to offset formation closure forces. For cements and sealing applications, controlled compressive forces of 100-3000 psig are used, and generally 150-1500 psig are used. These stresses (and the 30-100% strains) are above what prior art shape-memory polymers can deliver, and are below the expansive cement additives (e.g., CaO or MgO additions) that cause cracking and formation damage. The expandable sealant material of the present invention can be formulated to generate forces much greater than 3000 psig (e.g., 10000+ psig), thus representing an improved expandable material as compared to prior art rigid expandable fillers.

Figure 2:
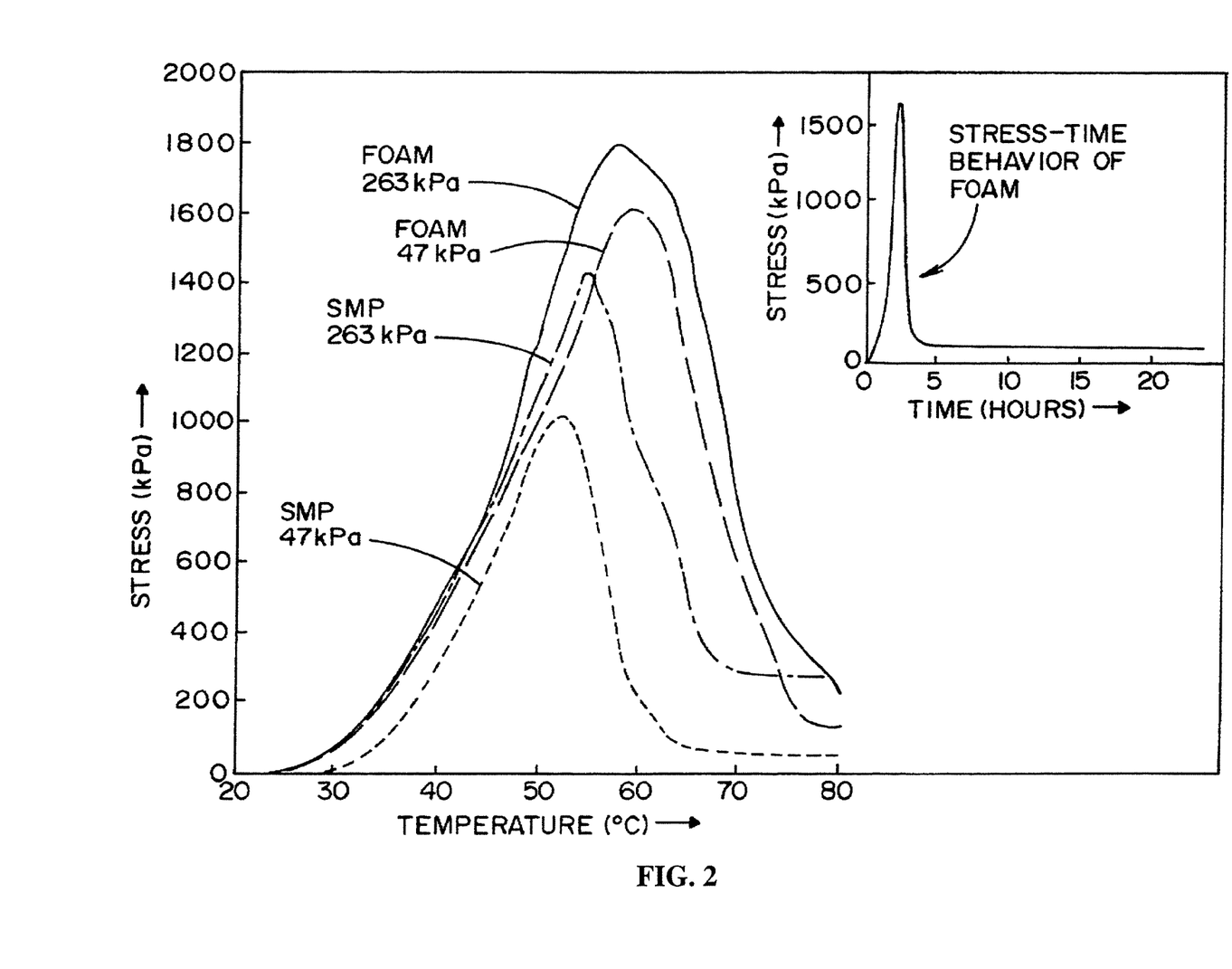
FIG. 2 is a graph illustrating expansive force applied by shape-memory polymer foams based on temperature change.

Prior artwork has investigated the use of shape-memory polymers (generally compressed foams) as expansive additives including related applications in fluid loss control. FIG. 2 illustrates the time-stress response of shape-memory polymer foams, which apply MPa level stresses, and expansions on the order of 25 vol. %. The 150-250 psi force from the shape-memory polymer is applied over narrow temperature ranges and is severely limited by hydrostatic pressures. Expansion of shape-memory polymers is effectively eliminated at a pressure of 3000 psig hydrostatic pressure or greater. The expandable sealant material of the present invention can be formulated to generate forces much greater than 3000 psig (e.g., 10000+ psig), thus representing an improved expandable material as compared to prior art shape-memory polymers.

The expandable sealant material in accordance with the present invention uses irreversible reactions of expandable fillers that are caused to expand in the fluid environment of the wellbore. The expansion forces generated by the expandable sealant material are able to be generated by hydration and/or oxidization reactions that are significantly higher than prior art shape-memory polymers (e.g., 100 MPa (15 KSI) or more). During the testing of hydrating cements (CaO→Ca(OH)$_2$), expansion forces were observed up to 22,000 psig (152 MPa). In testing of expandable proppants formed of CaO or magnesium particles in epoxy resins, expansion forces were measured at pressures of at least 10,000 psig hydrostatic pressure, while forces up to 25 MPa (3500 psig) could be exerted under high hydrostatic pressures against a constraining force. Mechanical strengths of greater than 8,000 psig compression were measured in cylindrical specimens. Typical expansive reactions used in the expandable sealant material of the present invention include one or more of the following reactions by the expandable filler in the expandable sealant material:

$CaO+H_2O \rightarrow Ca(OH)_2$ (fact reaction rate and 198 vol. % expansion);

$MgO+H_2O \rightarrow Mg(OH)_2$ (slow reaction rate and 224 vol. % expansion);

$Mg+H_2O \rightarrow Mg(OH)_2+H_2$ (fast reaction rate and 298 vol. % expansion);

$Fe+H_2O \rightarrow Fe(OH)_3+H_2$ (slow reaction rate and 362 vol. % expansion);

$Al + H_2O \rightarrow Al(OH)_3 + H_2$ (slow reaction rate and 324 vol. % expansion); and/or $Zn + H_2O \rightarrow Zn(OH)_2$ (medium reaction rate and 368 vol. % expansion).

These reactions take place at different speeds under different conditions, and the reactions are dependent on binder permeability (polymer) to water, saline, fracking fluid, etc., and the surface action of the expandable filler in the polymer matrix. The MgO and CaO reactions generally occur over hours (2-24 hours) to months at room temperature (77° F.), and such reactions generally accelerate significantly at higher temperatures (e.g. 120° F. or greater).

Magnesium fully hydrates slowly at room temperature (e.g., four hours to ten days), but hydrates appreciably at higher temperatures of 120° F. or greater (five minutes to three hours).

By adding galvanically-active catalysts (e.g., gallium, indium, nickel, iron, cobalt, copper, calcium, or lithium) to aluminum or magnesium or zinc, the rate of hydration of magnesium, aluminum, or zinc can be controlled.

Hydration rates or corrosion rates of the expandable filler of 0.05-100 microns/hr. (and all values and ranges therebetween) are desirable at temperatures of at least 100° F. In one non-limiting embodiment, the hydration rates or corrosion rates of the expandable filler are from 0.1-1 microns/hr. at temperatures of at least 100° F. Iron hydrates or corrodes slowly (e.g., less than 0.1 microns/hr.) at room temperature (77° F.), but hydrates or corrodes at a much faster rate at elevated temperatures (e.g., above 100° C. [212° F.]). Iron further oxidizes above 170° C. to magnetite, which is stable in very high temperature systems, such as geothermal systems.

It was found that expandable sealant material works best when used in fluids having a pH of 6-11 (and all values and ranges therebetween). Exposure of the expandable sealant material to fluids having a pH below 6 can result in the dissolution of hydroxides in the expandable sealant material, and to the reduction or loss of the expansion forces of the expandable sealant material if exposed to fluids having a pH below 6 for extended periods of time. However, exposure of the expandable sealant material to fluids having a pH of less than 6 for short periods of time (up to three-six hours) generally will not result in significant detrimental effects to the expandable sealant material.

The expansive reactions that occur in the expandable sealant material are generally irreversible under normal conditions. It was found that without a moderative binder in combination with the expansive reactions associated with the expandable filler, the reactions of the expandable filler can exert sufficient force to create fractures in the wellbore or cement and, when used with higher stiffness binders such as epoxy, the expansion reaction can induce additional fractures in the wellbore and cement. As such, to provide the desired sealing when using expandable filler, the amount of expansion of the expandable filler, as well as the transfer of load exerted by the expansion of the expandable filler, needs to be moderated by a) using an elastomeric binder, b) shaping/forming the expandable sealant material (e.g., compressed foam, etc.), and/or c) controlling the content of the expandable filler in the expandable sealant material.

By controlling the stiffness of the polymeric binder, using elastomer additions or low stiffness polymers, the expandable sealant material can be tailored to a) apply a certain amount of force, b) prevent the transmission of the extremely high forces (10,000 psi+) during the expansion of the expandable fillers, and/or c) limit the force application to 100-1500 psig (and all values and ranges therebetween), and typically to 250-500 psig. This tailoring of the stress and strain transfer of the expandable sealant material, and the retained elastic energy of the expandable sealant material, creates a resilient system (e.g., continues to deliver sealing and compressive force with changes in stress/dimensions, such as cyclic pressure or thermal loading). It is believed that the combination of the high stiffness expansive filler with the controlled stiffness of the elastic/deformable polymeric binder leads to enhanced wellbore integrity/sealing by the expandable sealant material. When the expandable sealant material uses an elastomeric binder, greater loadings can be used (they are limited in rigid binders due to fracture of the binder) to achieve up to 100% volumetric expansion/strain, while controlling the load applied by controlling the form (e.g., foam versus solid), and the properties of the elastomeric binder (its modulus).

Addition of secondary elastic additives can optionally be included in the expandable sealant material so as to elastically store compressive energy. Non-limiting examples of such secondary elastic additives include thermoset rubber crumbs, graphite, hollow microballoons, and other compressible inorganics. These secondary elastic additives can be used to further tailor or achieve desired strain recovery range of 5-80 vol. % (and all values and ranges therebetween), and typically 10-50 vol. %. In one non-limiting example, a secondary elastic additive having a 15-25 vol. % recoverable compressive strain along with 1-500 MPa stiffness (applied force) (and all values and ranges therebetween), and typically 2-100 MPa, can be used in the expandable sealant material to provide the desired properties to the expandable sealant material. These secondary elastic additives (when used) generally constitute about 0.5-50 wt. % (and all values and ranges therebetween) of the expandable sealant material. In one non-limiting embodiment, the secondary elastic additives constitute about 0.5-30 wt. % of the expandable sealant material. In another non-limiting embodiment, the secondary elastic additives constitute about 1-25 wt. % of the expandable sealant material. In another non-limiting embodiment, the secondary elastic additives constitute about 1-15 wt. % of the expandable sealant material. In another non-limiting embodiment, the secondary elastic additives constitute about 1-10 wt. % of the expandable sealant material.

In general, cement under compression (i.e., using casing expansion) shows improved long term hardness (strength) compared to cement without compressive stresses. (See M. Radonjic et al., "*Microstructures and Micromechanics of Wellbore Cement Under Compression*, www.researchgate.net/publication/270507450). The cement under compression leads to a reduction in gas voids and fracture sizes. As such, it has been found that by using a controlled expansive force by use of the expandable sealant material of the present invention, the expandable sealant material can be used to eliminate gas channels and porosity in the cement, while providing a continuous residual compressive strength to the cement and long term improvement in cement mechanical properties.

The use of the expandable sealant material of the present invention has been found to provide one or more of the following advantages:

Enables controlled compressive stresses to be applied to the cement and formation, thereby strengthening and stabilizing the wellbore;

Offers resilient sealing materials (large elastic recovery) that can block and seal annulus and cement fractures;

Can be applied as a coating (pump-down or pre-applied to casing or supports), as well as or alternatively as an additive to cement or drilling mud;

Is useful as a loss control additive, particularly in flake form, foil/sheet form, and mm-sized particles and shapes;

Can include dissolvable/degradable elastomers (e.g., PVA, PGA, PLA, etc.) for loss control in production zones. The dissolvable/degradable elastomers can optionally contain binders;

Stabilizes and strengthens formations and/or sand or gravel packs. Generally, when the expandable sealant material is added to formations, the particle size of the expandable sealant material is about 2-200 microns (and all values and ranges therebetween), and typically 5-50 microns. Generally, when the expandable sealant material is added to sand or gravel packs, the particle size of the expandable sealant material is about 1-500 mm (and all values and ranges therebetween);

Offers a toughening mechanism for cement to thereby inhibit fracture propagation by fracture blunting; and/or Eliminates porosity, fractures, gas channels, and bubbles in cement.

Unlike shape-memory polymers that will not expand when significant forces are applied to the shape-memory polymer, hydration reactions that lead to swelling and volume expansion of the expandable sealant material will occur even at high hydrostatic pressures such as 3500+ psig (a pressure that can exist at a typical cementing hydrostatic head). In addition, the expandable sealant material can be used to apply very significant forces (as high as 100 MPa or more).

The expandable sealant material is formulated to provide sufficient expansion to overcome cement shrinkage (typically around 4% for a class B cement), can be formulated to provide additional expansion to accommodate the application of residual compressive forces, and to close any gas porosity or voids in the cement. In one non-limiting embodiment, the expandable sealant material of the present invention is formulated to provide a total volume expansion to the cement (relative to annulus or total cement volume) of 2-10 vol. % (and all values and ranges therebetween). Such a volume expansion is believed to provide the best long term performance to the cement. In another non-limiting embodiment, the expandable sealant material of the present invention is formulated to provide a total volume expansion to the cement of 4-8 vol. %.

When the expandable filler is designed to 100% expansion in the expandable sealant material, the amount of expandable filler in the expandable sealant material is selected so that the expandable sealant material can cause a 2-10 vol. % expansion of the cement when the expandable sealant material is fully expanded. When the expandable filler is a metal (e.g., magnesium, zinc, aluminum, etc.), the volume percent of the metal in the expandable sealant material is generally about 20-40 wt. % (and all values and ranges therebetween) to achieve the desired expansion of the expandable sealant material. The expandable sealant material can be formed into various shapes (e.g., micron powder, mm-powder or particles, micron flakes, mm-flakes, rod-shaped, foil- or sheet-shaped, rope-shaped, football-shaped, etc.) as that it can be used for loss control in drilling fluids, and/or be added when a loss event is observed.

The expandable sealant material can be formulated to have the same or similar density to the cement density, mud density, or well fluid density; however, this is not required. When the expandable sealant material is to match or closely match the density of the cement, a combination of expandable fillers can be used in the expandable sealant material to achieve such density of the expandable sealant material. In one non-limiting example, zinc (7.24 g/cc) can be mixed with magnesium and/or CaO in a polymer to form the expandable sealant material so that the expandable sealant material matches or nearly matches the density of the cement or muds. In another non-limiting example, hollow microballoons and/or magnesium can be used in the expandable sealant material so that the expandable sealant material has the same or similar density as the brine or fracking fluid.

It has been found that improving wellbore integrity by adding controlled stress expansive elements to the wellbore (as opposed to controlled strain experiments conducted using casing expansion or expansive cement additions) improves the long-term performance of wells under cyclic thermal and pressure stresses. The improvement based on the use of expandable sealant materials is based on the ability to tailor the expansion and applied stress using solid and foamed expansive elastic composites with expansions from 30-150 vol. % and applied stresses in the range of 5-50 MPa. By controlling when and how the expandable sealant material is added, as well as the use of surfactants and/or adhesive additions (to control, for example, electrical attraction to the steel), micro-annulus and gas porosity defects in a wellbore can be effectively addressed.

When the expandable sealant material includes surfactant, the surfactant generally constitutes at least about 0.05 wt. % of the expandable sealant material. In one non-limiting embodiment, the surfactant constitutes 0.05-30 wt. % (and all values and ranges therebetween) of the expandable sealant material. In another non-limiting embodiment, the surfactant constitutes 1-25 wt. % of the expandable sealant material. In another non-limiting embodiment, the surfactant constitutes 5-22 wt. % of the expandable sealant material. The type surfactant used is non-limiting (e.g., ionic surfactant, non-ionic surfactant, amphoteric surfactant). The surfactant (when used) is generally used as a dispersing agent, emulsifying agent, and/or anti-foaming agent; however, the surfactant can have other or additional uses in the expandable sealant material.

When the expandable sealant material includes an adhesive, the adhesive generally constitutes at least about 0.05 wt. % of the expandable sealant material. In one non-limiting embodiment, the adhesive constitutes about 0.05-15 wt. % (and all values and ranges therebetween) of the expandable sealant material. In another non-limiting embodiment, the adhesive constitutes about 0.1-10 wt. % of the expandable sealant material. In another non-limiting embodiment, the adhesive constitutes about 0.5-8 wt. % of the expandable sealant material. In another non-limiting embodiment, the adhesive constitutes about 1-5 wt. % of the expandable sealant material. The adhesive (when used) can be used to facilitate in the adherence of the expandable sealant material to a structure (e.g., casing, wellbore wall, concrete structure, support structures, etc.) in the wellbore.

Figure 3:
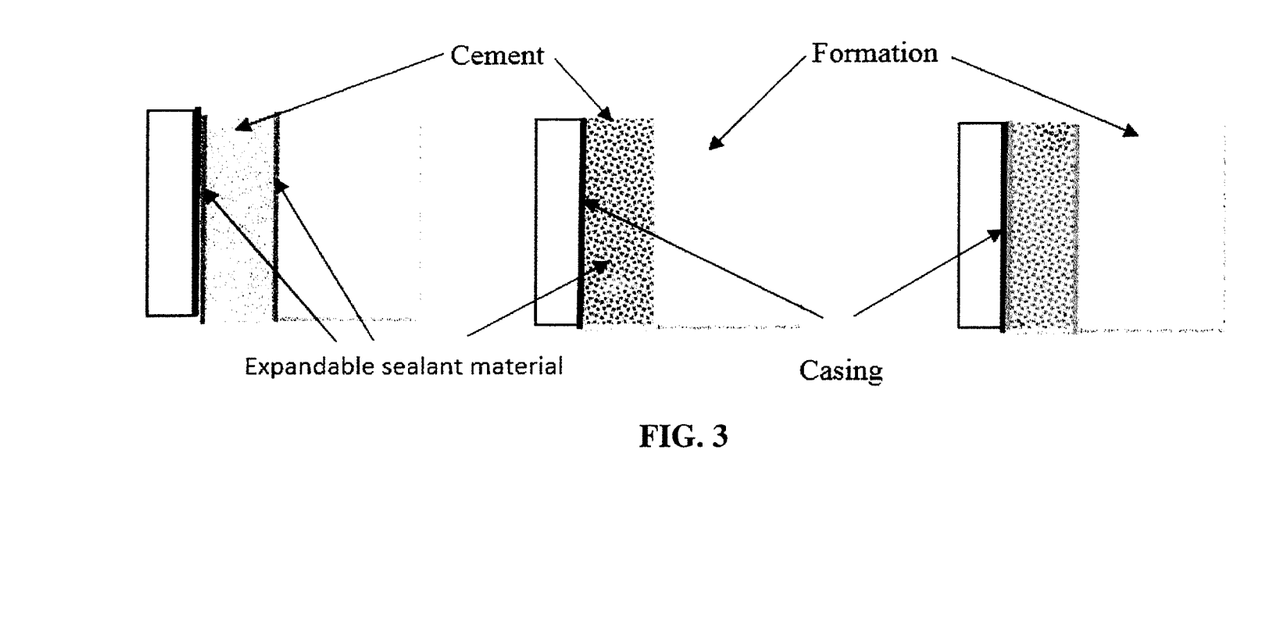
FIG. 3 is a schematic of a cemented, cased wellbore showing potential locations/application of the expandable sealant material in accordance with the present invention.

FIG. 3 illustrates three basic distributions of expandable sealant material that are enabled by pumping/placement methods and address micro-annulus and gas porosity defects.

When formulating the expandable sealant, one or more of the following non-limiting thermoplastic elastomers can be used:

thermoplastic polyolefinelastomers (TPO) (e.g., TPE-o);
thermoplastic vulcanizates (TPV) (e.g., TPE-v or TPV);
thermoplastic polyurethanes (TPU);
thermoplastic copolyester (TPC) (e.g., TPE-E);

thermoplastic polyamides (TPA) (e.g., TPE-A); not classified thermoplastic elastomers (e.g., TPZ); and/or EPDM and natural rubbers.

EPDM and natural rubbers can be used for compression-molded and pelletized materials.

Generally, a shore A 30-100 is used for the elastic binder, with a compounded and expanded hardness of shore A 50 to shore D 80, and typically shore A 70-95.

The following non-limiting examples of the expandable sealant material are provided.

Example 1

An expandable sealant material is fabricated by compounding 35 wt. % of milled degradable magnesium chips (Tervalloy™) with S-Series™ ellastolan thermoplastic polyurethane (BASF) in a compounding extruder and then injection molding the mixture into 30 mesh beads. Upon exposure to 70° C. water for 48 hours, the expandable sealant material exhibited a 94% volumetric expansion, and the expanded expandable sealant material has a 92 shore A hardness.

Example 2

The expandable sealant material beads of Example 1 were blended at 3 wt. % into a class B cement and poured in the annulus between two pipes. A strain gauge was attached to the outer casing, which showed a ½% strain, indicating that the cement was placed in compression. Sectioning of the cement after one week showed no significant microcracking or micro-annulus cracking at either cement/steel interface.

Example 3

An expandable sealant material was fabricated by compounding 30 wt. % milled, degradable magnesium chips into elasstolan TPU using a mixtruder. The extrudate was extruded into filaments which were twisted into rope with a ¼" diameter. The rope was cut to 4" lengths and knotted to form ⅝+ diameter knots. 300 knots were added to circulating mud where the expandable sealant material successfully sealed fractures and reduced circulation loss by over 95% after four hours.

Example 4

An expandable sealant material was fabricated by compounding 30 wt. % milled degradable magnesium alloy chips with TPU thermoplastic elastomer into a thin sheet using a compounding extruder and then pelletized into 80-100 mesh material using a pulverizer grinder system. The pulverized elastomer was blended at 20 wt. % with a surfactant and 3 wt. % adhesive (PVA) and added to a fluid pad prior to the pumping of cement, so that the formation and the casing surfaces were coated with the expandable sealant material. After pumping cement and waiting seven days, a 10-mil resilient coating of expandable sealant material remained at the formation-cement interface, and the formation was placed in compression.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall there between. The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

What is claimed:

1. An expandable cement, said expandable cement is comprised of cement and 5-40 wt. % expandable sealant material; said expandable sealant material including an elastomer and 5-70 wt. % of an expandable filler; said elastomer including one or more materials selected from the group consisting of nylon/polyarylates, polycarbonates, polysulfones, polyureas, polyesters, epoxys, polypropylene, polyethylene, TPU, rubber, PVA, PVC, thermoplastic polyolefinelastomers, TPO, thermoplastic vulcanizates, TPV, thermoplastic polyurethanes, TPU, thermoplastic copolyester, TPC, thermoplastic polyamides, TPA and TPZ; said expandable filler material including one or more materials selected from the group consisting of MgO, CaO, $Li_2O$, borate, selenium, iron, magnesium, manganese, germanium, calcium, aluminum, sodium, lithium, zinc, silicon, titanium, $Ca_2C$, $MgH_2$, $TiH_2$, water-swellable clay, $CO_2$-swellable clay, phosphate compound, carbide compound, silicate compound, borate compound, and sulfate compound.

2. The expandable cement as defined in claim 1, wherein said expandable sealant material includes a degradable or dissolvable coating, said degradable or dissolvable coating including one or more of a polymer material or a metallic material, said degradable or dissolvable coating having coating thickness of about 0.0001-0.5 mm.

3. The expandable cement as defined in claim 1, wherein said expandable sealant material is in the form of a powder or particulate with a particle size of 0.001-20 mm.

4. The expandable cement as defined in claim 1, wherein said expandable sealant material includes a filler, said filler including one or more materials selected from the group consisting of carbon, glass, and microballoons.

5. The expandable cement as defined in claim 4, wherein said filler has a density of less than 1 g/cc.

6. The expandable cement as defined in claim 1, wherein said expandable sealant material has a density of about 1-2 g/cc.

7. The expandable cement as defined in claim 1, wherein said expandable sealant material includes surfactant, said surfactant constituting about 0.05-30 wt. % of said expandable sealant material.

8. The expandable cement as defined in claim 1, wherein said expandable sealant material includes adhesive, said adhesive constituting about 0.05-15 wt. % of said expandable sealant material.

9. The expandable cement as defined in claim 1, wherein said expandable sealant material includes 5-45 wt. % expandable filler, 35-90 wt. % elastomer, 0-25 wt. % surfactant, and 0-10 wt. % adhesive.

10. A wellbore that includes a casing and an expandable sealant material, said wellbore having a wellbore wall; said expandable sealant material is a) coated on at least a portion of an outer surface of said casing, b) intermixed with cement that is positioned between said casing and said wellbore well, and/or c) positioned between said casing and said wellbore wall; said expandable sealant material including an elastomer and 5-70 wt. % of an expandable filler; said elastomer including one or more materials selected from the group consisting of nylon/polyarylates, polycarbonates, polysulfones, polyureas, polyesters, epoxys, polypropylene, polyethylene, TPU, rubber, PVA, PVC, thermoplastic polyolefinelastomers, TPO, thermoplastic vulcanizates, TPV, thermoplastic polyurethanes, TPU, thermoplastic copolyester, TPC, thermoplastic polyamides, TPA and TPZ; said expandable filler material including one or more materials selected from the group consisting of MgO, CaO, $Li_2O$, borate, selenium, iron, magnesium, manganese, germanium, calcium, aluminum, sodium, lithium, zinc, silicon, titanium, $Ca_2C$, $MgH_2$, $TiH_2$, water-swellable clay, $CO_2$-swellable clay, phosphate compound, carbide compound, silicate compound, borate compound, and sulfate compound.

11. The wellbore as defined in claim 10, wherein said expandable sealant material is intermixed with said cement to form an expandable cement, said expandable cement comprising 60-95 wt. % cement and 5-40 wt. % expandable sealant material.

12. The wellbore as defined in claim 10, wherein said expandable sealant material includes a degradable or dissolvable coating, said degradable or dissolvable coating including one or more of a polymer material or a metallic material, said degradable or dissolvable coating having coating thickness of about 0.0001-0.5 mm.

13. The wellbore as defined in claim 10, wherein said expandable sealant material is in the form of a powder or particulate with a particle size of 0.001-20 mm.

14. The wellbore as defined in claim 10, wherein said expandable sealant material includes a filler, said filler including one or more materials selected from the group consisting of carbon, glass, and microballoons.

15. The wellbore as defined in claim 14, wherein said filler has a density of less than 1 g/cc.

16. The wellbore as defined in claim 10, wherein said expandable sealant material has a density of about 1-2 g/cc.

17. The wellbore as defined in claim 10, wherein said expandable sealant material includes surfactant, said surfactant constituting about 0.05-30 wt. % of said expandable sealant material.

18. The wellbore as defined in claim 10, wherein said expandable sealant material includes adhesive, said adhesive constituting about 0.05-15 wt. % of said expandable sealant material.

19. The wellbore as defined in claim 10, wherein said expandable sealant material includes 5-45 wt. % expandable filler, 35-90 wt. % elastomer, 0-25 wt. % surfactant, and 0-10 wt. % adhesive.

20. A method for improving the integrity of a wellbore, said method comprises:
   a. providing an expandable sealant material, said expandable sealant material including an elastomer and 5-70 wt. % of an expandable filler; said elastomer including one or more materials selected from the group consisting of nylon/polyarylates, polycarbonates, polysulfones, polyureas, polyesters, epoxys, polypropylene, polyethylene, TPU, rubber, PVA, PVC, thermoplastic polyolefinelastomers, TPO, thermoplastic vulcanizates, TPV, thermoplastic polyurethanes, TPU, thermoplastic copolyester, TPC, thermoplastic polyamides, TPA and TPZ; said expandable filler material including one or more materials selected from the group consisting of MgO, CaO, $Li_2O$, borate, selenium, iron, magnesium, manganese, germanium, calcium, aluminum, sodium, lithium, zinc, silicon, titanium, $Ca_2C$, $MgH_2$, $TiH_2$, water-swellable clay, $CO_2$-swellable clay, phosphate compound, carbide compound, silicate compound, borate compound, and sulfate compound;
   b. providing a casing for a wellbore;
   c. inserting said casing into said wellbore;
   d. inserting a cement material between an outer wall of said casing and a wellbore wall of said wellbore to form a cement layer;
   e. allowing said cement layer to set between said outer wall of said casing and said wellbore wall;
   f. placing said expandable sealant material in said wellbore between said outer wall of said casing and said wellbore wall after said casing has been inserted into said wellbore, said step of placing includes i) mixing said expandable sealant material with said cement prior to said step of inserting said cement between said outer wall of said casing and said wellbore wall of said wellbore, ii) placing said expandable sealant material between said outer wall of said casing and said cement layer, iii) placing said expandable sealant material at between said cement layer and said wellbore wall of said wellbore, iv) adding said expandable sealant material to a drilling fluid and/or a completion fluid prior to and/or after said step of inserting said cement between said outer wall of said casing and said wellbore wall of said wellbore, and inserting said expandable sealant material and said drilling and/or completion fluid into said wellbore, and/or v) coating said outer wall of said casing and/or said wellbore wall of said wellbore with said expandable sealant material and subsequently inserting cement between said outer wall of said casing and said wellbore wall of said wellbore; and,
   g. causing said expandable sealant material to expand to create compressive stresses to one or more structures selected from the group consisting of said cement layer, a mud layer, said wellbore wall, a liner wall and said outer wall of said casing.

21. The method as defined in claim 20, wherein said step of causing said expandable sealant material to expand includes exposing said expandable sealant material to a pH change, a chemical environment change, exposure to an electric current, temperature change, sound waves, and/or electromagnetic radiation.

22. The method as defined in claim 20, wherein said cement layer includes 60-95 wt. % cement and 5-40 wt. % expandable sealant material.

23. The method as defined in claim 20, wherein said expandable sealant material is mixed with said drilling fluid or completion fluid prior to said expandable sealant material being inserted into said wellbore.

24. The method as defined in claim 20, wherein said expandable sealant material has a density of ±0-30% of a density of said wellbore fluid or said completion fluid.

25. The method as defined in claim 20, wherein said expandable sealant material is formulated to expand in volume by 50-500%.

26. The method as defined in claim 20, wherein said expandable sealant material includes a degradable or dissolvable coating, said degradable or dissolvable coating including one or more of a polymer material or a metallic material, said degradable or dissolvable coating having coating thickness of about 0.0001-0.5 mm.

27. The method as defined in claim 20, wherein said expandable sealant material is in the form of a powder or particulate with a particle size of 0.001-20 mm.

28. The method as defined in claim 20, wherein said expandable sealant material includes a filler, said filler including one or more materials selected from the group consisting of carbon, glass, and microballoons.

29. The method as defined in claim 28, wherein said filler has a density of less than 1 g/cc.

30. The method as defined in claim 20, wherein said expandable sealant material has a density of about 1-2 g/cc.

31. The method as defined in claim 20, wherein said expandable sealant material includes surfactant, said surfactant constituting about 0.05-30 wt. % of said expandable sealant material.

32. The method as defined in claim 20, wherein said expandable sealant material includes adhesive, said adhesive constituting about 0.05-15 wt. % of said expandable sealant material.

33. The method as defined in claim 20, wherein said expandable sealant material includes 5-45 wt. % expandable filler, 35-90 wt. % elastomer, 0-25 wt. % surfactant, and 0-10 wt. % adhesive.

* * * * *